United States Patent
Fulton et al.

(10) Patent No.: US 9,212,627 B2
(45) Date of Patent: Dec. 15, 2015

(54) DIESEL ENGINE WATER IN FUEL SEPARATOR AND RESERVOIR AUTOMATIC DRAIN SYSTEM AND CONTROL STRATEGY

(71) Applicant: Ford Global Technologies, LLC, Dearborn, MI (US)

(72) Inventors: Brien Lloyd Fulton, West Bloomfield, MI (US); Carlos Armesto, Canton, MI (US); Larry Castleberry, Detroit, MI (US); Brad Allen Brown, Leonard, MI (US); Armando Chacon, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 613 days.

(21) Appl. No.: 13/622,958

(22) Filed: Sep. 19, 2012

(65) Prior Publication Data
US 2014/0081558 A1 Mar. 20, 2014

(51) Int. Cl.
*B60T 7/12* (2006.01)
*F02M 25/022* (2006.01)
*F02M 37/22* (2006.01)
*F02M 25/07* (2006.01)

(52) U.S. Cl.
CPC ....... *F02M 25/0222* (2013.01); *F02M 25/0742* (2013.01); *F02M 37/221* (2013.01); *Y02T 10/121* (2013.01)

(58) Field of Classification Search
CPC .............. F02D 41/22; F02D 2041/224; F02D 2200/0611; F02M 25/0222; F02M 25/0227; F02M 37/221; G01N 33/2835
USPC ................... 123/568.11, 568.15, 25 R, 25 N
See application file for complete search history.

(56) References Cited

U.S. PATENT DOCUMENTS

| | | | | |
|---|---|---|---|---|
| 5,241,940 | A * | 9/1993 | Gates, Jr. | 123/676 |
| 6,092,512 | A * | 7/2000 | Ma | 123/568.15 |
| 6,112,705 | A * | 9/2000 | Nakayama et al. | 123/25 C |
| 6,207,045 | B1 | 3/2001 | Jiang | |
| 7,655,140 | B2 | 2/2010 | Wieczorek et al. | |
| 2006/0277899 | A1 * | 12/2006 | Ruona | 60/286 |
| 2011/0099977 | A1 * | 5/2011 | Takahashi | 60/274 |
| 2012/0279200 | A1 * | 11/2012 | Nam et al. | 60/273 |
| 2014/0020398 | A1 * | 1/2014 | Mittricker et al. | 60/772 |

FOREIGN PATENT DOCUMENTS

WO 0194773 A1 12/2001

* cited by examiner

*Primary Examiner* — John Kwon
(74) *Attorney, Agent, or Firm* — Julia Voutyras; Alleman Hall McCoy Russell & Tuttle LLP (57) ABSTRACT

Methods and systems are provided for draining water separated from diesel fuel into an EGR system. In response to the water volume in the fuel system and EGR flow at pre-determined levels, water may be introduced into the EGR system. EGR flow may also be controlled in response to introducing water into the EGR system and engine operating conditions.

17 Claims, 6 Drawing Sheets

DIESEL ENGINE WATER IN FUEL SEPARATOR AND RESERVOIR AUTOMATIC DRAIN SYSTEM AND CONTROL STRATEGY

BACKGROUND/SUMMARY

Diesel engines may utilize fuel/water separators to remove water from fuel, into a reservoir, and then inject the separated fuel into the engine system. These systems aim to reduce engine degradation caused by the presence of water in the fuel. Some fuel/water separators require manual drainage of water from the reservoir. If the vehicle operator does not drain the reservoir, water may enter and cause damage to the fuel system. Other separators may include an automatic drainage system; however, regulations prohibit discarding of the separated water to the environment. Thus, some systems automatically drain the water from the reservoir to an alternate location in the exhaust system.

One example approach is shown by Ruona et al. in U.S. 2006/0277899. Therein, the water separated from the fuel is injected into an exhaust after-treatment device and eliminated as water vapor. The water is introduced, as a dose, into the after-treatment device when the stored water level in the reservoir (receiving water from the separator) reaches a predetermined level.

However, the inventors herein have recognized potential issues with such systems. For example, while such operation can dispose of the collected water, the shift in the exhaust gas composition caused by the water can affect catalyst performance. Specifically, the water can not only affect the catalyst chemistry and reactions, but it can also cool the exhaust temperature due to evaporation of the water, reducing catalyst conversion efficiency.

In one example, the issues described above may be at least partly addressed by a method comprising automatically draining the water from a diesel fuel system into an exhaust gas recirculation system. For example, water from the fuel/water separator may be returned back into the engine for disposal via the exhaust gas recirculation (EGR) system. In this way, the introduced water may mix with recirculated exhaust in the EGR system before re-entering the intake manifold for combustion.

In one example, during engine operation, water may be separated from the fuel system via a fuel/water separator and stored in a reservoir. In response to a water level in the reservoir reaching a threshold level and EGR above a minimum flow threshold, an automatic draining of the water to the EGR system may be initiated. Therein, by opening a valve, water may flow from the water reservoir into the EGR system. Based on the amount of engine dilution introduced into the EGR via the water, an amount of exhaust gas recirculated via the EGR valve may be reduced. The mixture of water and EGR may then be introduced, together, into the intake manifold for combustion in the engine. By introducing water into the intake of the engine via the EGR system, catalyst conditions can be maintained. Specifically, a temperature of the catalyst can be maintained, while also maintaining catalyst conversion efficiency and chemistry. By mixing the water with the EGR before introduction into the engine, and introducing the water via the engine intake rather than the engine exhaust, changes in catalyst chemistry caused due to water at the exhaust catalyst can also be reduced. Disposing of water in this way may also allow reduction of EGR when water is introduced. For example, once the water volume in the fuel system reaches a predetermined level and EGR flow is above a minimum flow threshold, water may be introduced. By adjusting an amount of EGR based on the amount of water introduced into the EGR system, a desired engine dilution can be provided with lower EGR while still providing NOx reduction benefits. As in EGR, the introduced water may also be used to absorb heat and reduce combustion temperatures, improving engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
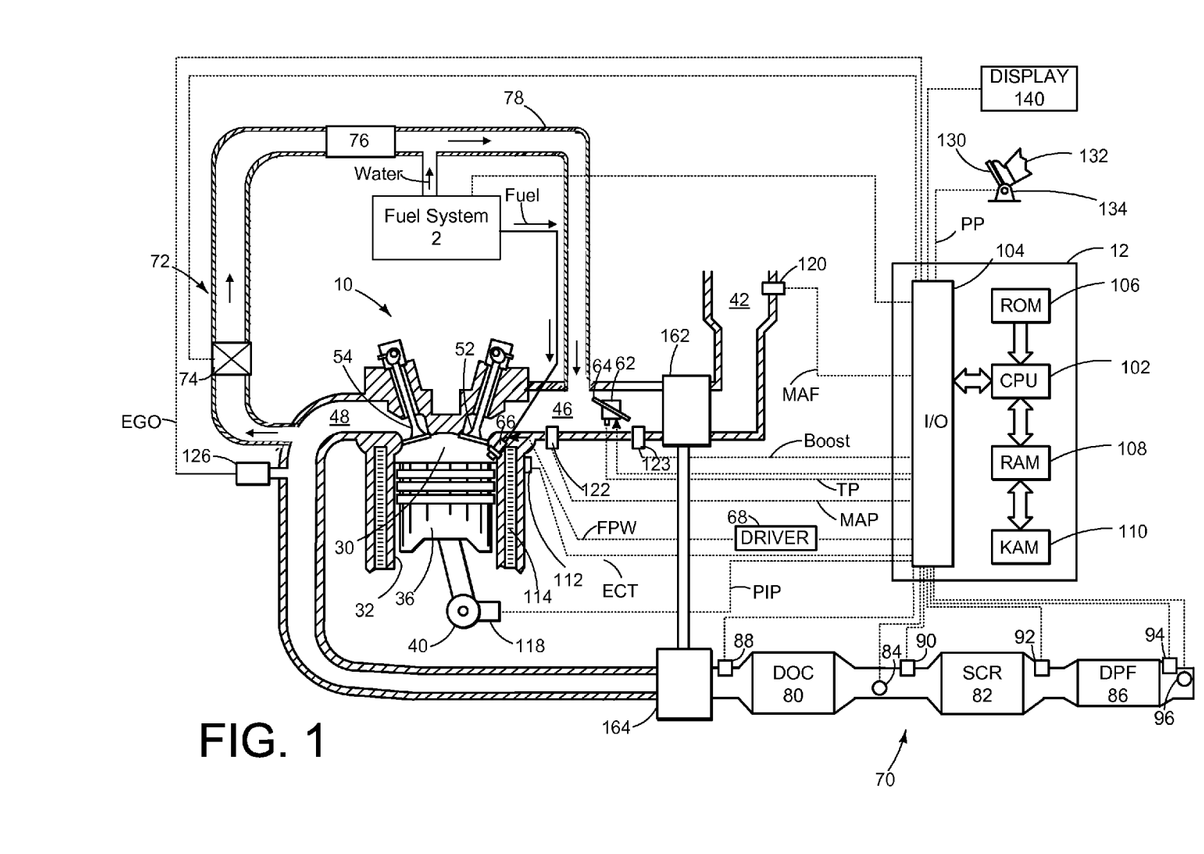
FIG. 1 is a schematic diagram of an example diesel engine including an exhaust gas recirculation system, fuel system, and exhaust after-treatment system.
Figure 2:
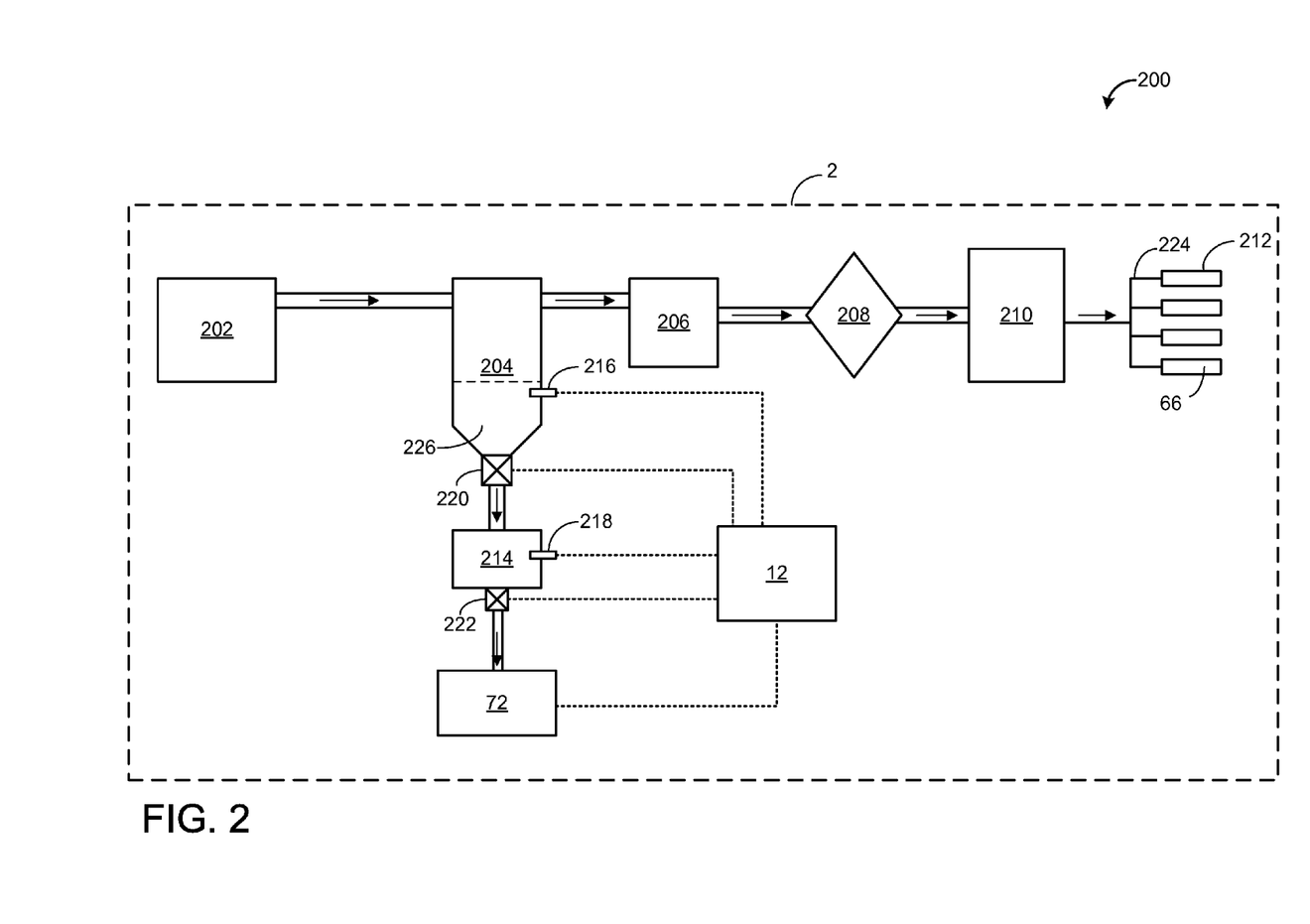
FIG. 2 is a schematic diagram of an example fuel system with a controlled, automatic water drain for introducing water into an exhaust gas recirculation system.
Figure 3:
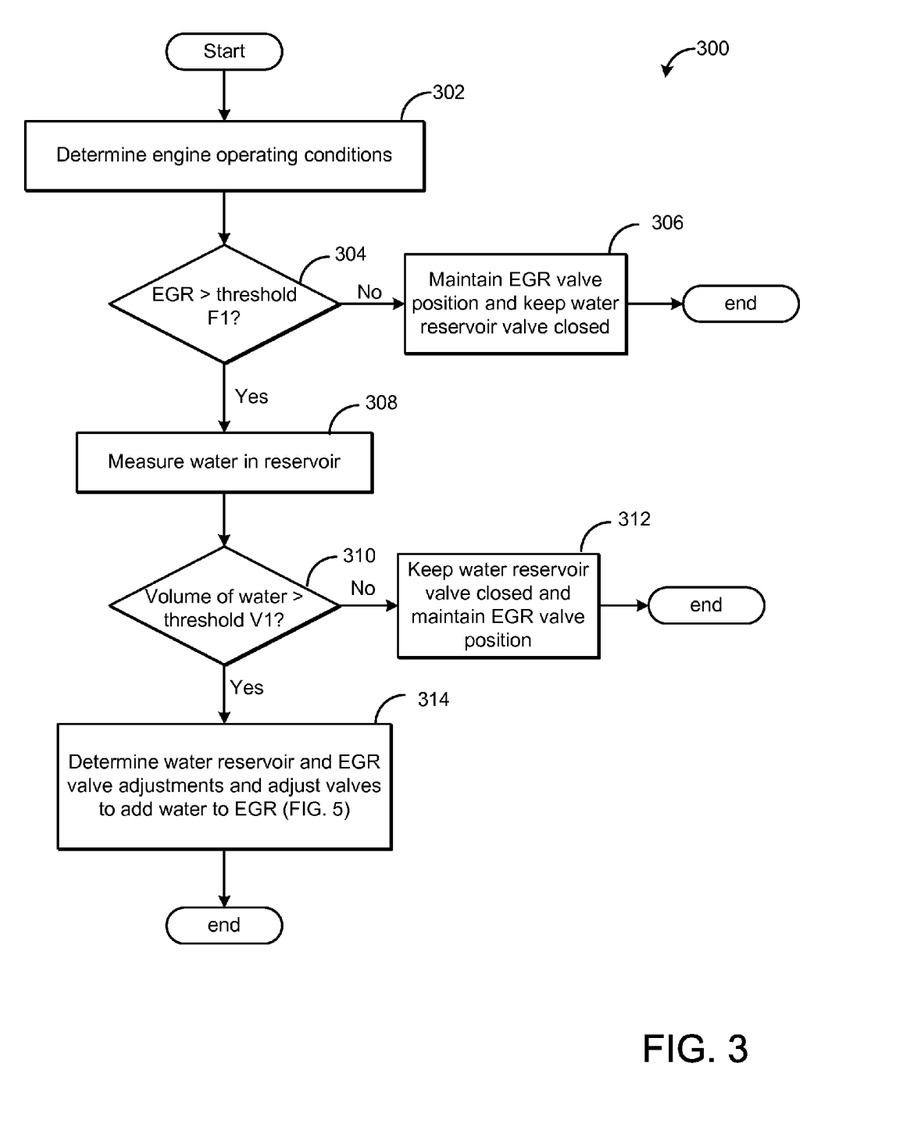
FIG. 3 shows a high level flow chart of a method for controlling the introduction of water from the fuel system to the exhaust gas recirculation system.
Figure 5:
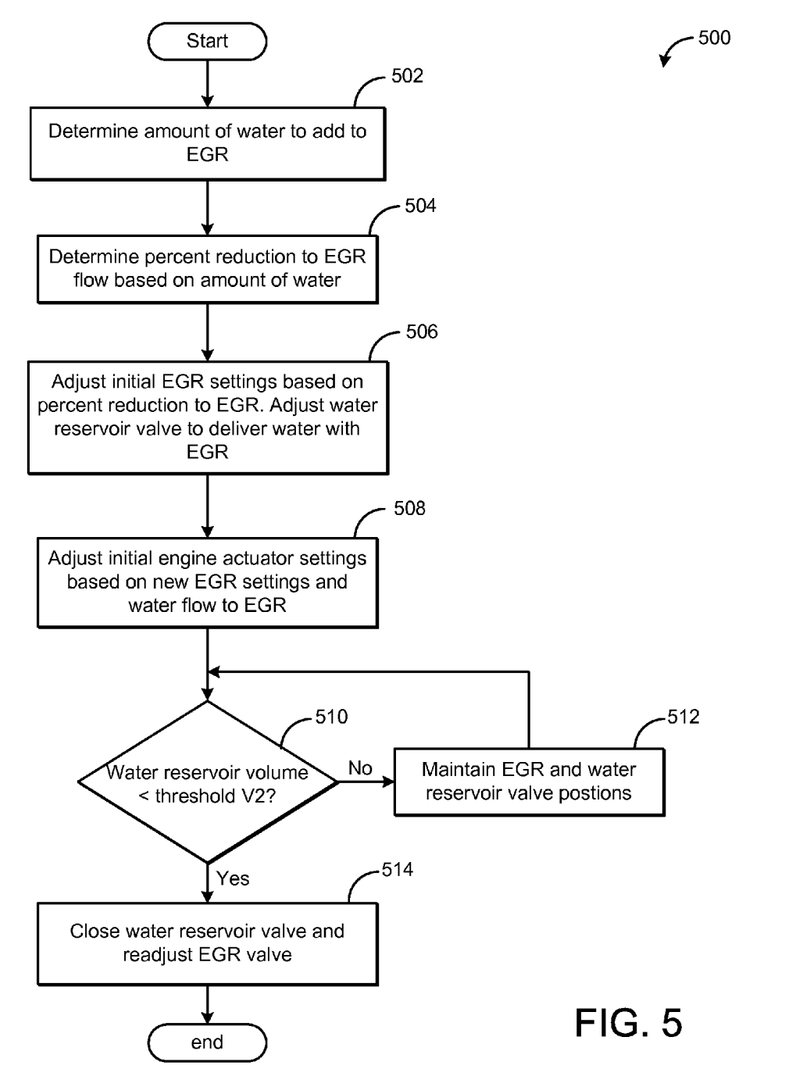
Figure 6:
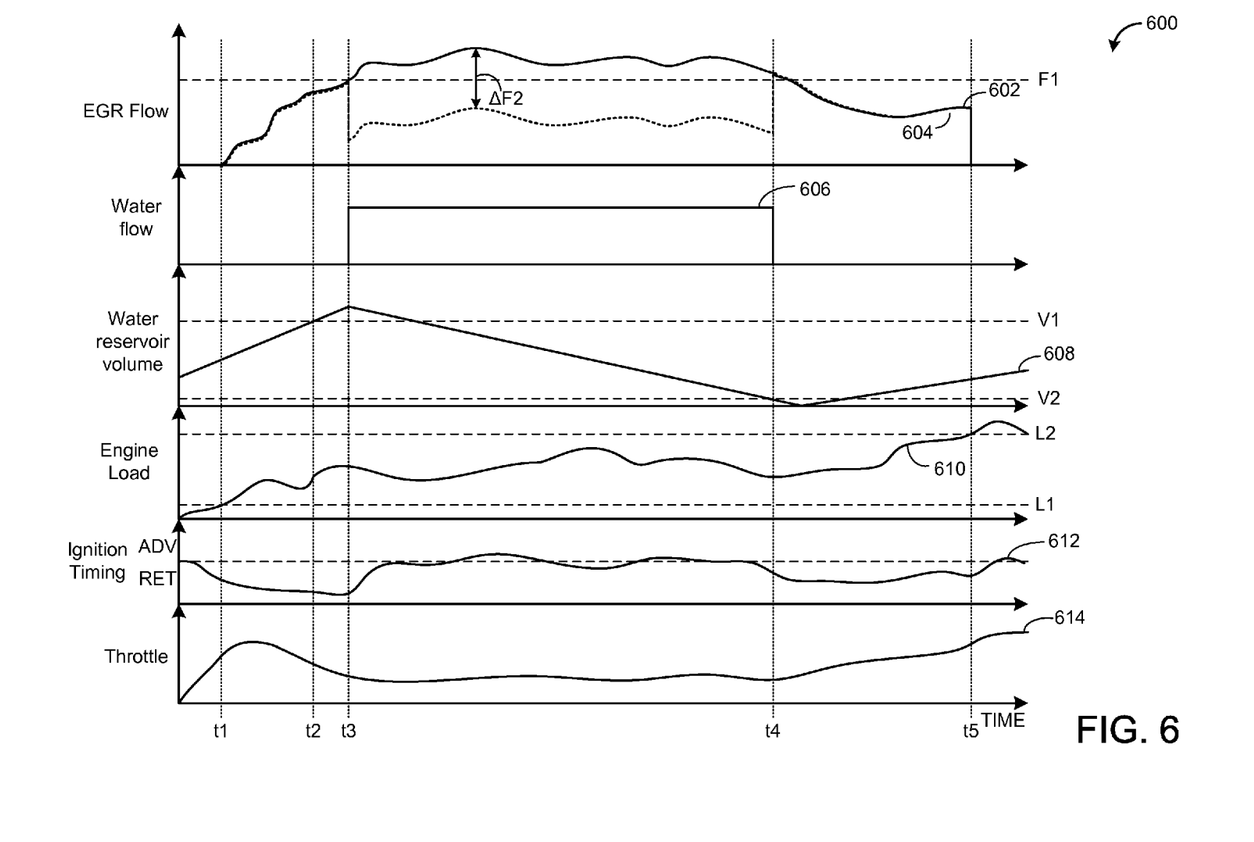
FIG. 6 shows an example adjustment to EGR during draining of water from a diesel fuel system into an EGR system.

The following description relates to systems and methods for automatically draining water from a fuel/water separator into the exhaust gas recirculation (EGR) system for a diesel engine, such as the engine shown in FIG. 1. Water filtered from a fuel/water separator in a fuel system, as shown in FIG. 2, may be collected in a water reservoir and then automatically drained into the EGR system, downstream of an EGR valve. A method for introducing water into the EGR system when the water volume and EGR flow are at pre-determined levels is shown in FIG. 3. A controller may perform a control routine, such as the routines of FIGS. 4-5 to determine initial EGR settings based on engine operating conditions, and then modify the initial settings during introduction of water into the EGR system. An example adjustment is shown in FIG. 6.

Turning now to FIG. 1, a schematic diagram showing one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 46 via intake passage 42 and may exhaust combustion gases via exhaust passage 48. Intake manifold 46 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by fuel system 2. Fuel system 2 may include various components, including a fuel/water separator and a water reservoir (shown in FIG. 2). While fuel from fuel system 2 may travel to the engine via fuel injector 66, water may travel from the water reservoir in fuel system 2 to the engine via the EGR system. Fuel system 2 components will be presented in more detail at FIG. 2.

The injection timing of fuel from the fuel injector (or injectors) may be adjusted, depending on engine operating conditions. For example, fuel injection timing may be retarded or advanced from controller pre-set values in order to maintain desired engine torque and performance.

Intake manifold 46 may include a throttle 62, positioned upstream of an EGR passage 78 and intake manifold 46 junction, having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Combustion chamber 30 or one or more other combustion chambers of engine 10 may be operated in a compression ignition mode, without an ignition spark. Further, engine 10 may be turbocharged by a compressor 162 disposed along the intake manifold 46 and a turbine 164 disposed along the exhaust passage 48 upstream of the exhaust after-treatment system 70. Though FIG. 1 shows only one cylinder of a multi-cylinder engine, each cylinder may similarly include its own set of intake/exhaust valves, fuel injector, etc.

Exhaust gas sensor 126 is shown coupled to exhaust passage 48 upstream of an exhaust gas after-treatment system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. An exhaust gas recirculation (EGR) system 72 may recirculate a desired portion of exhaust gas from exhaust passage 48 to intake manifold 46 via EGR passage 78. The amount of EGR provided to intake manifold 46 may be varied by controller 12 via EGR valve 74. The amount of EGR flow may be influenced by engine load. For example, EGR valve 74 may be closed under conditions of high or very low (e.g., zero) engine load.

Under some conditions, the EGR system may be used to regulate the temperature of the air and fuel mixture within the combustion chamber. EGR may reduce combustion chamber temperatures and reduce the amount of NOx generated. Thus, EGR settings (e.g., flow, amount, temperature) may be set based on a desired engine dilution level in order to reduce NOx emissions. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

While EGR may help to reduce NOx emissions, increased EGR may also negatively affect engine performance. In some situations, excessive EGR may cause engine misfires and/or partial burn events. EGR may also make combustion less efficient. Additionally, EGR may introduce soot or other contaminants into the engine. Therefore, adjustments to engine actuators (described further below) in response to EGR flow may be used to maintain desired engine performance. For example, during increased EGR, a throttle opening may be decreased to maintain a desired torque.

Introducing water from fuel system 2 into EGR system 72 may affect EGR and engine performance. In one example, adding water to EGR may cause more engine dilution than was requested, degrading engine performance. Thus, modification to EGR system control may be needed when water is introduced. For example, during water introduction, the amount of EGR may be reduced. Controller 12 may also adjust engine actuators during water introduction. Actuator adjustments may include adjusting injection timing and/or adjusting throttle opening. For example, injection timing may be advanced in response to water introduction to the EGR.

The exhaust gas after-treatment system 70 may include a plurality of emission control devices, each of which may carry out an exothermic reaction with excess oxygen present in the exhaust during selected conditions (e.g., selected temperatures). For example, the exhaust gas after-treatment system 70 may include a diesel oxidation catalyst (DOC) 80 disposed along exhaust passage 48 downstream of turbine 164. The diesel oxidation catalyst may be configured to oxidize HC and CO in the exhaust gas. A selective catalytic reduction catalyst (SCR) catalyst 82 may be disposed along the exhaust gas conduit downstream of DOC 80. The SCR catalyst may be configured to reduce NOx in the exhaust gas to nitrogen and water. A urea sprayer 84 (or any suitable SCR reductant source, such as an ammonia source) may be disposed upstream of SCR catalyst 82 and downstream of DOC 80. A diesel particulate filter (DPF) 86 may be disposed along the exhaust conduit downstream of SCR catalyst 82. The DPF may be configured to remove diesel particulate matter (or soot) from the exhaust gas.

Temperature sensors 88, 90, 92, and 94 may be disposed at points along the exhaust gas conduit both upstream and downstream of each after-treatment device in the after-treatment system 70. The temperature sensors may be used to determine, for example, when to regenerate DPF 86. Further, an oxygen sensor 96 (e.g., an UEGO sensor) may be disposed downstream of the exhaust after-treatment system 70 for measuring an exhaust gas air/fuel ratio. It should be understood that exhaust after-treatment system 70 may include a plurality of after-treatment device configurations not shown in FIG. 1. In one example, the exhaust after-treatment system may only include a DOC. In another example, the exhaust after-treatment system may include a DOC followed downstream by a DPF. In another example, the exhaust after-treatment system may include a DOC followed downstream by a DPF then and SCR. In still another example, SCR catalyst 82 shown in FIG. 1 may be replaced with a lean NOx trap (LNT). Further, the order or arrangement of the different catalysts and filters in the exhaust after-treatment system may vary. The number of temperature sensors disposed within the exhaust after-treatment system may vary according to the application and/or configuration. Though the oxygen sensor (96) is shown in FIG. 1 at a point located downstream of exhaust after-treatment system 70, it may be located upstream of any of the bricks in the after-treatment system 70, in which case it can only monitor the catalyst bricks upstream of it.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; boost pressure (Boost) from boost pressure sensor 123; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Additionally, controller 12 may communicate with a cluster display device 140, for example to alert the driver of faults in the engine or exhaust after-treatment system.

Furthermore, controller 12 may communicate with various actuators, which may include engine actuators such as fuel injectors, an electronically controlled intake air throttle plate, camshafts, etc. Engine actuators may be adjusted based on various engine controls, including control of the EGR system. For example, engine actuators such as the throttle plate may need to be adjusted when the amount of EGR is altered (via changing the position of EGR valve 74). Further details related to example EGR system control will be described below in reference to FIGS. 4-6. In some examples, storage medium read only memory chip 106 may be programmed with computer readable data representing instructions executable by microprocessor unit 102 for performing the methods described below as well as other variants that are anticipated but not specifically listed.

FIG. 2 shows a schematic 200 of a detailed embodiment of the fuel system 2 previously introduced in FIG. 1. Diesel fuel may be supplied to fuel tank 202. Diesel fuel travels from fuel tank 202 to a fuel/water separator 204 where water-based fluid may be separated from the diesel fuel. The separated fuel may then exit the fuel/water separator and travel to supply pump 206. The fuel may then pass through another filter 208. Filtered fuel is then pumped via injection pump 210 into a fuel rail 224. Fuel rail 224 may distribute fuel to a set of fuel injectors 212. Four fuel injectors are shown in FIG. 2; however, there may be any number depending on the number of cylinders in the vehicle. A fuel injector 66 may inject fuel into a combustion chamber 30, as shown in FIG. 1.

Returning to fuel/water separator 204, the separated water-based fluid (herein referred to as water) may drain into a water collection reservoir 226 at the bottom of the fuel/water separator. Fuel/water separator 204 may further include a water-in-fuel (WIF) sensor 216 to detect the amount of water in the water collection reservoir 226. WIF sensor 216 may be any suitable sensor (e.g., optical, thermal, or electric conductivity, etc.) and may be, for example, coupled to an inner surface of water collection reservoir 226. In some embodiments, WIF sensor 216 may be positioned at a threshold level that corresponds to a pre-determined threshold volume of water that has been separated from the fuel system. The threshold level may be pre-determined so as to correspond to, for example, a volume of fluid beyond which the probability of introducing water into the engine (with the fuel) is significantly increased. As such, if water is introduced into the engine with the fuel, engine degradation may result. Thus, WIF sensor 216 can indicate when a threshold level of water has accumulated in the reservoir, so that an engine controller can take actions to reduce degradation to the fuel system and/or engine. For example, when the sensor detects that a threshold level of water has been exceeded, a raw voltage signal may be produced by the sensor indicating a water-in-fuel condition. This signal may be received by controller 12, triggering the opening of valve 220 and subsequent drainage of water from water collection reservoir 226.

In some embodiments, a water reservoir 214 may be coupled to fuel/water separator 204. Water reservoir 214 may be larger than water collection reservoir 226, allowing for additional water accumulation. Thus, this second reservoir may allow for more flexibility in reservoir volume thresholds for water introduction into the EGR system. Flow of water from the water collection reservoir 226 to the water reservoir 214 may be controlled by controller 12 via valve 220. In alternate embodiments of fuel system 2, water may drain directly from the water collection reservoir 226 to EGR system 72 via valve 220. Water reservoir 214 may also include a water reservoir sensor 218 to measure the amount of water in the reservoir. As for the WIF sensor 216 described above, water reservoir sensor 218 may be any suitable sensor and may be coupled to the inner surface of water reservoir 214. Water reservoir sensor 218 may provide controller 12 with information on water level and/or water volume. When a threshold water level or volume, V1, is reached, a signal may be sent to controller 12 to indicate that water may be drained from the reservoir and introduced into the EGR system 72. Controller 12 may open water reservoir valve 222 to allow drainage of water into the inlet of the EGR when additional engine operating conditions are satisfied. Methods for controlling water reservoir valve 222 and introduction of water into the EGR system will be described further below in reference to FIGS. 3-5.

Introducing water from the water reservoir 214 into EGR system 72 may allow EGR flow to be reduced, while still controlling NOx emission levels. As in EGR, the introduced water may also absorb heat and reduce combustion temperatures. As discussed above, while EGR may decrease NOx emissions, it may also negatively influence engine performance and add contaminants to the intake air. In addition, the addition of water to EGR may cause more engine dilution than was requested, degrading engine performance. Thus, it may be advantageous to add water from the fuel system to the EGR system selectively under conditions when EGR may be correspondingly reduced. For example, if EGR flow is above a minimum threshold flow F1 and the amount of water in water reservoir 214 is above threshold level V1, water may be introduced. These thresholds may be determined by engine operating conditions and EGR requirements. For example, the minimum threshold flow of EGR (F1) may be defined such that adding a certain amount of water when EGR flow is above minimum threshold flow of EGR F1 allows reduction in EGR flow by a minimum percentage, X %. In some embodiments, this minimum percentage may be 50%. In other embodiments, this percentage may be smaller or larger than 50%. Threshold level V1 may be a water level or water volume in water reservoir 214. This threshold may also be defined to reduce EGR flow by X % when introducing water into the EGR system. Specifically, threshold level V1 may correspond to a water reservoir volume/amount which allows EGR to be reduced by a certain percentage (X %) during introduction of the water volume into the EGR system.

Figure 4:
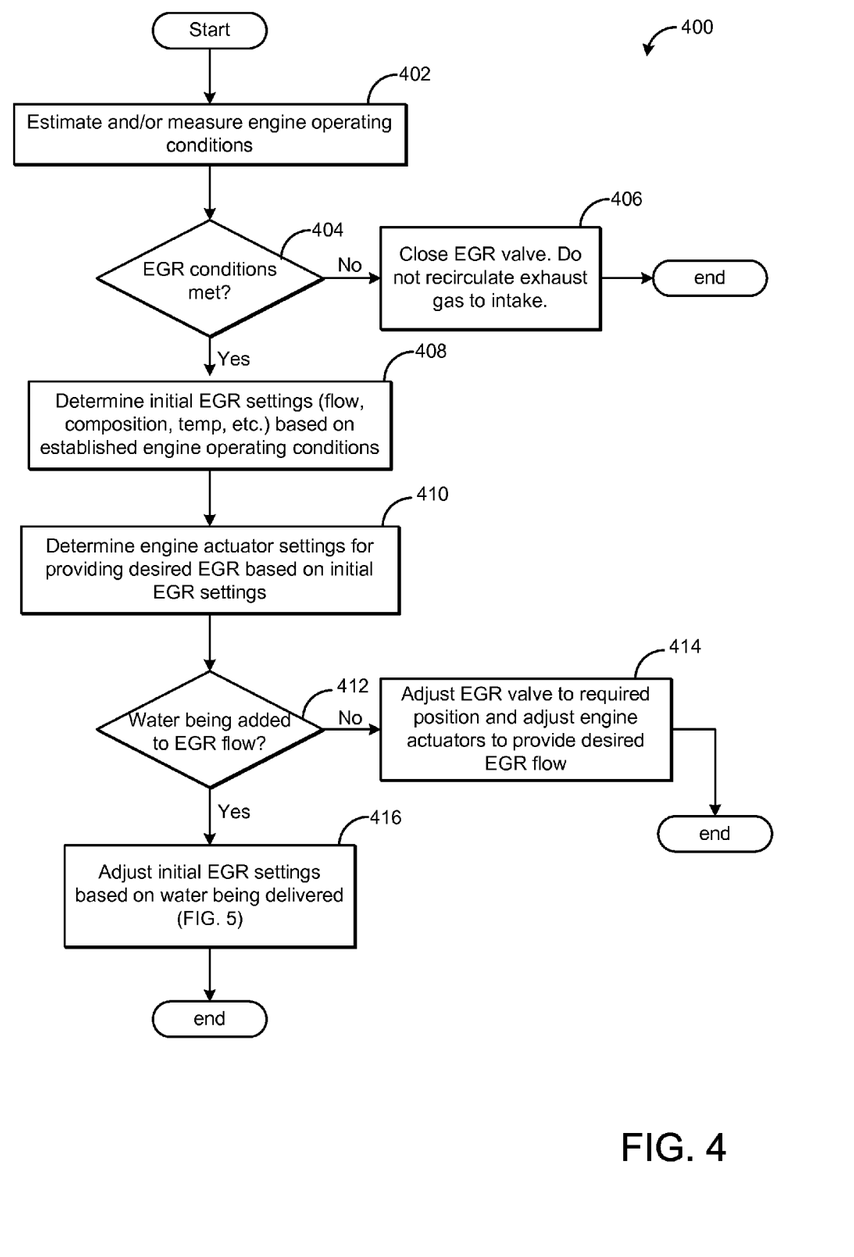
FIGS. 4-5 show flow charts illustrating a method for controlling an exhaust gas recirculation system during introduction of water from a fuel system.

Controller 12 may coordinate introduction of water into the EGR system by controlling engine system actuators, including EGR valve 74 and water reservoir valve 222. EGR requirements stored in controller 12 and engine operating conditions (e.g., engine load) may influence operation of these valves. For example, as discussed above, the EGR valve may be closed under conditions of high or very low (e.g., zero) engine load. In this example, water reservoir valve 222 may stay closed, even if the water reservoir volume is greater than threshold level V1. As another example, EGR valve 74 may be open and EGR flow above threshold flow F1. If water is introduced into the EGR system from the fuel system, the EGR valve may be adjusted such that EGR flow is reduced. In this way, the opening of the EGR valve may be controlled in response to engine operating conditions and further modified when water is added from the fuel system. Further details of EGR system control and modification during water introduction is shown in FIGS. 4-5, described in detail below. Water reservoir valve 222 may also be controlled by controller 12 in response to water at threshold level V1 and EGR at minimum threshold flow F1. In this way, water reservoir valve 222 may open only when both thresholds, V1 and F1, have been reached.

Further, controller 12 may change the opening of EGR valve 74 and water reservoir valve 222, controlling EGR flow and water flow, respectively. Thus, the desired EGR flow, determined by controller 12, may be achieved by adjusting the EGR valve. In some cases, desired EGR flow may be different than actual EGR flow. For example, when water is introduced from the water reservoir into the EGR system, EGR flow may be reduced. Increased water flow into the EGR system during water reservoir drainage may compensate for the decrease in EGR flow. Thus, the combined water and EGR flow may equal the equivalent desired EGR flow to reduce NOx. Specifically, when water is introduced, EGR flow may be reduced by X % such that the actual EGR flow and the added water flow produces the desired EGR flow into intake manifold 46. Thus, during water reservoir drainage, actual EGR flow may be less than desired EGR flow. Further illustration of this control is illustrated in FIG. 6, discussed below.

Turning now to FIG. 3, an example method 300 for controlling the introduction of water from the fuel system 2 to the inlet of an EGR system 72 is shown. Method 300 begins at 302 by determining the engine operating conditions. These may include engine load, engine speed, BP, MAP, MAF, EGR flow, catalyst temperature, throttle position, engine temperature, etc. The routine determines if EGR flow is above a minimum threshold flow F1, at 304. If EGR flow is not above threshold F1, the EGR valve position is maintained and the water reservoir valve 222 remains closed at 306. However, if EGR flow is above threshold F1, the routine measures the amount of water in water reservoir 214 at 308. At 310, the routine determines if the volume of water in the water reservoir is greater than threshold V1. If the volume of water is not greater than V1, the water reservoir valve remains closed and the EGR valve position is maintained at 312. However, if the volume of water is greater than V1, the routine determines at 314 the water reservoir and EGR valve adjustments to drain the water from the water reservoir to the EGR system. The method also makes these adjustments at 314. The method at 314 is presented in further detail in FIG. 5, explained below.

FIG. 4 shows a method 400 for controlling the EGR system. Method 400 begins at 402 by estimating and/or measuring engine operating conditions. These may include engine load, EGR flow, EGR composition, engine temperatures, and throttle position. At 404, the routine determines if conditions for enabling EGR are met. These may include engine load within a threshold range and engine speed within a threshold range. For example, EGR may be enabled only when the engine load is between a minimum threshold L1 and maximum threshold L2. In some embodiments, L1 may be zero load. In other embodiments, L1 may be some value larger than zero. If EGR enabling conditions are not met, the routine closes the EGR valve at 406; thus, cutting off EGR flow to intake manifold 46. However, if engine load is between L1 and L2 and all other EGR conditions are met, the routine determines the desired EGR settings at 408. This may be based on engine operating conditions (e.g., engine load) and mandated EGR requirements. EGR settings may include EGR flow, EGR amount, EGR valve position, EGR composition, and EGR temperature. At 410, the routine determines the corresponding adjustment to engine actuators for providing the desired EGR. This may include adjusting EGR valve position. In one example, throttle opening may be reduced to decrease intake air entering the intake manifold in response to an increase in EGR flow to the intake manifold. In another example, fuel injection timing may be retarded in coordination with increased EGR flow.

Method 400 continues on at 412 to determine whether water is being added to the EGR flow (Method 300). If water is being added to EGR, the routine adjusts the initial EGR settings based on water being delivered to the EGR system. Additional details of an example method for adding water to EGR and adjusting EGR control is explained below in reference to FIG. 5. If water is not being added to EGR, the controller adjusts the EGR valve to the required position (determined in 408) and adjusts the engine actuators to provide the desired EGR flow.

As introduced in method 400, EGR system control is modified during water introduction from the fuel system. FIG. 5 illustrates a method 500 for adding water from the fuel system water reservoir to the EGR system while simultaneously adjusting EGR control. The routine begins at 502 by determining the amount of water to add to the EGR system. This may be based on the volume of water in the water reservoir, the desired EGR flow, and engine operating conditions. For example, the amount of water determined at 502 may be the amount of water in the reservoir, or the amount of water to return the reservoir to a volume below threshold level V1. The amount of water determined at 502 may be a volume which may be used to calculate a desired flow rate. Once this water volume or flow rate is determined, the routine determines the percent reduction in EGR flow (X %) during introduction of the determined water amount. In some cases, this may be 50%. In other cases, this percent may be larger or smaller than 50%. As such, the percent reduction in EGR flow may increase as the water amount increases.

At 506, the routine adjusts the initial EGR settings (determined in method 400) based on the percent reduction to EGR. The water reservoir valve is also adjusted to deliver water with the new EGR flow. For example, the water reservoir valve may be opened to a predetermined position to allow water flow into the EGR. In another example, the amount of water reservoir valve opening may be variable based on a desired water flow rate (determined at 502). In this way, the water reservoir valve opening may be adjusted to deliver a specific volume of water at a higher flow rate over a shorter period of time or a lower flow rate over a longer period of time. At 508, the routine adjusts the engine actuator settings based on the new EGR settings and the water flow to the EGR. The controller may simultaneously adjust the EGR valve, water reservoir valve, and engine actuators. Engine actuator adjustments may include adjusting injection timing and/or adjusting throttle opening. For example, injection timing may be advanced in response to water introduction to the EGR.

At 510, the routine determines if the water reservoir volume is lower than a second threshold level V2. This threshold is less than first threshold level V1. In one example, second threshold level V2 may be zero (reservoir may be empty). In another example, second threshold level V2 may be a value greater than zero. If the water volume is not less than V2, the routines maintains the EGR and water reservoir valve positions to continue the water draining procedure at 512. From 512, the routine checks the water reservoir volume again at 510. If the water reservoir volume is less than V2, the routine closes the water reservoir valve and readjusts the EGR valve at 514, ending the routine. The EGR valve may be readjusted to its previous setting or to a new setting based on the current engine op conditions, as determined in method 400.

Turning now to FIG. 6, graph 600 illustrates an example of adjusting EGR flow and engine actuators (e.g., injection timing and throttle position) in response to engine load and draining water from the fuel system into the EGR system. Graph 600 includes desired EGR flow at plot 602, actual EGR flow at plot 604, water flow (from the water reservoir) at plot 606, water reservoir volume at plot 608, engine load at plot 610, injection timing at plot 612, and throttle opening at plot 614.

Prior to time t1, engine load may be low. Since engine load is less that threshold load L1 prior to time t1, the EGR valve is closed and there is no EGR flow (plots 602 and 604). At time t1, engine load (plot 610) increases above L1, causing the EGR valve to be opened by a controller to recirculate an amount of exhaust gas. Engine load (plot 610) and EGR flow (plots 602 and 604) continue to increase after time t1. Throttle opening decreases between time t1 and time t2, as a result of EGR flow increasing. Water reservoir volume (plot 608) increases steadily and reaches threshold level V1 at time t2. However, EGR flow (plot 604) is below threshold flow F1 so the water reservoir valve remains closed. Finally, at time t3, EGR flow increases to F1 (plot 604). Thus, water drainage from the water reservoir to the EGR system is initiated in response to EGR flow above F1 and water reservoir volume above V1. At time t3, the water reservoir valve opens, turning on water flow (plot 606). This allows actual EGR flow (plot 604) to decrease relative to desired EGR flow (plot 602). The increase in water flow to the EGR system (plot 606) accounts for the difference in actual and desired EGR flow, ΔF2. Ignition timing is advanced (612) from time t3 to t4 while water is added to the EGR. The ignition timing may be advanced/retarded by adjusting injection timing (advanced/retarded, respectively), for example, or spark timing for a spark ignition example. Between time t3 and time t4, the water reservoir volume (plot 608) decreases while water flow into the EGR system continues. At time t4, the water reservoir volume falls below lower threshold V2, triggering the water reservoir valve to close, stopping water flow (plot 606). At this time, actual EGR flow (plot 604) increases back to the desired EGR flow (plot 602). Engine load increases above L2 at time t5, causing the EGR valve to close and EGR flow (plots 602 and 604) to turn off.

In this way, water separated from diesel fuel may be drained automatically from a fuel system into an EGR system, downstream of an EGR valve. Together, EGR and water may mix and enter the intake manifold, downstream of a throttle. Water may be introduced into the EGR system only when water volume in the water reservoir is above a threshold level and EGR flow is above a threshold flow. Normal EGR control, based on engine operation conditions such as engine load, may be modified during water drainage. Introduction of water may allow EGR flow to decrease by a certain percentage, while still reducing NOx emissions. Adjustments to engine actuators, including throttle opening and injection timing, may be made in response to changes in EGR and water flow. Disposing of water from diesel fuel in this way may decrease degradation of the engine system from water in the fuel, while providing dilution control in the engine.

As will be appreciated by one of ordinary skill in the art, routines described herein may represent one or more of any number of EGR and engine adjustment controls. As such, various steps or functions illustrated may be performed in the sequence illustrated, in parallel, or in some cases omitted. Likewise, the order of control is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An engine method, comprising:
automatically draining water from a diesel fuel system into an exhaust gas recirculation (EGR) system in response to an EGR flow above a threshold flow; and
adjusting an amount of EGR in response to the water introduced from the diesel fuel system.

2. The method of claim 1, wherein automatically draining water into the EGR system includes draining water from a water reservoir coupled to the diesel fuel system into an EGR passage downstream of an EGR valve.

3. The method of claim 2, wherein automatically draining water includes without input from a vehicle operator.

4. The method of claim 1, wherein automatically draining water from the diesel fuel system includes introducing the water into the EGR system upstream of an engine intake manifold and downstream of an EGR control valve.

5. The method of claim 4, wherein the adjusting includes reducing the amount of EGR as an amount of water introduced into the EGR system increases.

6. The method of claim 2, wherein automatically draining water includes introducing the water when a water volume in the water reservoir is above a threshold water level.

7. The method of claim 4, further comprising adjusting each of injection timing and throttle position in response to the adjusting an amount of EGR.

8. An engine method, comprising:
automatically draining water from a diesel fuel system into an exhaust gas recirculation (EGR) system in response to a water volume in a water reservoir of the diesel fuel system being above a threshold level and responsive to an EGR flow above a threshold flow; and
adjusting EGR flow via an EGR valve by a percentage responsive to an amount of drained water to the EGR system.

9. The method of claim 8, wherein water is introduced to the EGR system downstream of the EGR valve.

10. The method of claim 9, wherein EGR is reduced when introducing water into the EGR system.

11. The method of claim 10, wherein injection timing and throttle position are adjusted in response to the adjustment in EGR.

12. The method of claim 11 wherein the EGR system is a high pressure EGR system.

13. An engine system, comprising:
- an engine including an intake manifold and exhaust passage;
- a diesel fuel system including a water reservoir, the diesel fuel system configured to deliver fuel to fuel injectors and deliver water from the water reservoir to an exhaust gas recirculation (EGR) system;
- an EGR passage coupled between the intake manifold and exhaust passage and configured to recirculate an amount of exhaust gas from the exhaust passage to the intake manifold, the passage including an EGR valve;
- a throttle positioned upstream of the EGR passage and an intake manifold junction; and
- a controller with computer readable instructions for automatically draining water from the diesel fuel system into the EGR system in response to a water volume in the water reservoir above a threshold water level and an EGR flow above a threshold flow, and reducing EGR flow via the EGR valve by an amount responsive to an amount of drained water to the EGR system.

14. The system of claim 13 wherein the EGR system is a high pressure EGR system.

15. The system of claim 14 further comprising a turbocharger.

16. The system of claim 15 further comprising an SCR catalyst.

17. The system of claim 15 further comprising a common rail injection system.

* * * * *